US007103280B1

(12) United States Patent
Ionov et al.

(10) Patent No.: US 7,103,280 B1
(45) Date of Patent: *Sep. 5, 2006

(54) ARCHITECTURE FOR AN OPTICAL SATELLITE COMMUNICATION NETWORK

(75) Inventors: Stanislav I. Ionov, Calibasas, CA (US); George C. Valley, Los Angeles, CA (US); Anthony S. Acampora, La Jolla, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,351

(22) Filed: Jun. 5, 1999

(51) Int. Cl.
*H04B 10/00* (2006.01)

(52) U.S. Cl. ............ 398/121; 398/115; 398/116; 398/117; 398/118; 398/119; 398/122; 398/123; 398/124; 398/125; 398/128; 398/129; 398/130; 398/131; 398/135; 398/136; 398/137; 398/139; 455/427; 455/428; 455/430; 455/12.1; 455/13.1; 370/316; 370/323; 370/310; 370/315; 370/400; 370/474; 370/394

(58) Field of Classification Search ............ 455/427, 455/428, 430, 12.1, 13.1; 370/316, 323, 370/310, 315, 400, 474, 394; 398/115, 116, 398/117, 118, 119, 121, 122, 123, 139, 124, 398/125, 128, 129, 130, 131, 135, 136, 137
See application file for complete search history.

(56) References Cited

U.S. PATENT DOCUMENTS

| 4,545,075 | A | | 10/1985 | Miller et al. ............ 155/612 |
| 4,928,317 | A | * | 5/1990 | Franchini ............ 455/601 |
| 5,119,225 | A | * | 6/1992 | Grant et al. ............ 398/123 |
| 5,218,467 | A | | 6/1993 | Ross et al. ............ 359/172 |
| 5,394,489 | A | * | 2/1995 | Koch ............ 385/14 |
| 5,475,520 | A | | 12/1995 | Wissinger | |
| 5,552,920 | A | * | 9/1996 | Glynn ............ 359/152 |
| 5,661,582 | A | * | 8/1997 | Kintis et al. ............ 359/172 |
| 5,710,652 | A | | 1/1998 | Bloom | |
| 5,870,216 | A | * | 2/1999 | Brock et al. ............ 398/49 |
| 5,884,142 | A | | 3/1999 | Wiedeman et al. | |
| 5,956,620 | A | | 9/1999 | Lazaris-Brunner et al. | |
| 6,002,916 | A | | 12/1999 | Lynch | |
| 6,032,041 | A | * | 2/2000 | Wainfan et al. ............ 455/427 |
| 6,043,776 | A | | 3/2000 | Chiba et al. ............ 342/354 |
| 6,128,112 | A | | 10/2000 | Harres | |

(Continued)

OTHER PUBLICATIONS

Pending U.S. Appl. No. 09/327,767, filed Jun. 7, 1999, S. I. Ionov et al.

(Continued)

*Primary Examiner*—Hanh Phan
(74) *Attorney, Agent, or Firm*—Georgann S. Grunebach

(57) ABSTRACT

A satellite constellation has a plurality of satellites. Each of the satellites has an RF ground link for communicating with a ground station and an optical link for communication with at least one of the plurality of satellites. Each of the satellites has a reconfigurable optical transmitter for sending and receiving data streams. Each reconfigurable optical transmitter has a first optical carrier associated therewith and a reconfigurable optical receiver. The plurality of satellites is arranged to have a first subset of satellites. The first subset of satellites is configured to communicate. The plurality of satellites is reconfigured to have a second subset of satellites having at least one different satellites than that of said first subset. The second subset supercedes the first subset. The second subset of satellites is configured to communicate. Various subset around the globe may form local area networks. The local area networks are preferably optically coupled to form a wide area network.

32 Claims, 3 Drawing Sheets

U.S. PATENT DOCUMENTS

| | | |
|---|---|---|
| 6,160,994 A | 12/2000 | Wiedeman |
| 6,208,625 B1 * | 3/2001 | Zancho et al. ............... 370/316 |
| 6,219,617 B1 * | 4/2001 | Dreischer et al. ........... 701/226 |
| 6,222,658 B1 | 4/2001 | Dishman et al. ............. 359/172 |
| 6,226,493 B1 | 5/2001 | Leopold et al. ............. 455/13.1 |
| 6,243,513 B1 * | 6/2001 | Wade ........................... 385/24 |
| 6,257,526 B1 * | 7/2001 | Taormina et al. ....... 244/158 R |
| 6,267,329 B1 | 7/2001 | Chethik .................. 244/158 R |
| 6,295,152 B1 | 9/2001 | Wedding |
| 6,304,354 B1 * | 10/2001 | Carlson ....................... 359/172 |
| 6,307,879 B1 | 10/2001 | Moriyama ................... 375/219 |
| 6,327,063 B1 * | 12/2001 | Rockwell .................... 359/172 |
| 6,339,707 B1 * | 1/2002 | Wainfan et al. ............. 455/427 |
| 6,366,761 B1 * | 4/2002 | Montpetit ................... 455/12.1 |
| 6,477,153 B1 * | 11/2002 | Leopold et al. ............. 370/316 |
| 6,545,787 B1 * | 4/2003 | Lenormand et al. ........ 359/172 |

OTHER PUBLICATIONS

Pending U.S. Appl. No. 09/313,428, filed Jun. 7, 1999, S. I. Ionov et al.

D. Grybos, "Technology For The Future Marketplace" A Perspective on Ka and On-Board Processing Technology—1998 The Institution of Electrical Engineers—Printed & Published by the IEE, Savoy Place, London WC2R 0BL, UK.

* cited by examiner

| | 1 | 2 | 3 | 4 | 5 | 6 | 7 |
|---|---|---|---|---|---|---|---|
| 1 | NA | 1,2 | 1,3 | 1,4 | 1,2,5 | 1,3,6 | 1,4,7 |
| 2 | 2,1 | NA | 2,1,3 | 2,4 | 2,5 | 2,4,6 | 2,5,7 |
| 3 | 3,1 | 3,1,2 | NA | 3,4 | 3,4,5 | 3,6 | 3,6,7 |
| 4 | 4,1 | 4,2 | 4,3 | NA | 4,5 | 4,6 | 4,7 |
| 5 | 5,2,1 | 5,2 | 5,4,3 | 5,4 | NA | 5,7,6 | 5,7 |
| 6 | 6,3,1 | 6,4,2 | 6,3 | 6,4 | 6,7,5 | NA | 6,7 |
| 7 | 7,4,1 | 7,5,2 | 7,6,3 | 7,4 | 7,5 | 7,6 | NA |

48 —

ARCHITECTURE FOR AN OPTICAL SATELLITE COMMUNICATION NETWORK

TECHNICAL FIELD

The present invention relates to space and communications satellites, and more particularly, to a communication system to interconnect satellites.

BACKGROUND ART

Satellites in geostationary orbits (GSO's) have been widely preferred because of the economic advantages afforded by such orbits. In a geostationary orbit, a satellite traveling above the earth's equator, in the same direction as that in which the earth is rotating, and at the same angular velocity, appears stationary relative to a point on the earth. These satellites are always "in view" at all locations within their service areas, so their utilization efficiency is effectively one-hundred percent. Antennas on earth need be aimed at a GSO satellite only once; no tracking system is required.

Coordination between GSOs and with terrestrial services is facilitated by governmental allocation of designated "slots" angularly spaced according to service type.

Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

The bottleneck in ground-to-satellite communications may be overcome by increasing the number of RF beams on board of a single satellite, increasing the number of satellites, e.g. deploying those using low earth orbits (LEO's), medium earth orbits (MEO's), or by putting several satellites into a single GSO slot and by using higher frequencies, for example, the Ka band (up to approximately 40 GHz). This appears to be a limit on the number of RF antennas on board of a single satellite. At this point, 50–100 antennas. Growth to higher frequencies is limited by difficult problems in technology and propagation. Expansion in satellite applications requires exploitation of the spatial dimension (i.e., above and below the GSO belt). A host of proposed LEO and MEO systems exemplify this direction.

Therefore, the only remaining way for increasing the capacity of satellite communication systems is increasing the number of the satellites. In this approach, the satellites are interconnected into a network that serves a wide geographic area. Today, laser communication links are planned for intersatellite communications. The advantage of optical intersatellite links over RF links derives from (i) reduced power consumption and (ii) considerably smaller size and weight of an optical telescope versus an RF antenna. As a result, a single satellite can house more communication links, thereby increasing the overall data-handling capacity.

Satellite communications systems employing multiple RF ground links and optical intersatellite links will use complicated switching electronics to route the ever increasing volumes of data traffic. Systems that are being developed include a router that acts as a high speed switch. All data whether optical or RF uplink or downlink signals are converted to the electrical domain and routed appropriately through the satellite. The high speed switching electronics are enlarged to accommodate the optical signals.

High speed switching electronics consume a significant amount of electric power which is always at a premium on board of satellites. Moreover, as the volume of data traffic transmitted by numerous RF and optical channels of a satellite increases, the electronic switch becomes the bottleneck that limits the overall network capacity.

Passive optical routing (which retains and redirects signals destined for further relaying to other satellites in optical domain without down conversion to electronic format) is an attractive way of unloading the on-board electronic switch. Such passive optical routing requires designated optical carriers for each pair of communicating satellites on any intersatellite link. The benefits of passive optical routing include: i) increased network handling capacity due to unloading the electronic switch, ii) transparency to communication protocols, i.e., the intermediate satellites do not have to understand the nature of the signal in order to route it, iii) non-blocking connectivity, i.e., a data stream is not required to wait until a communication link is done with transmitting data to another satellite.

Unfortunately, optical routing may be limited by the number of optical carriers available in a network. As networks become large, a significant amount of optical carriers would be used if only one optical carrier frequency could be used for only one interconnection in the system. It would therefore be desirable to reduce the number of optical carriers by using a unique optical carrier for each overlapping network path. This allows non-overlapping paths to reuse the same optical carrier.

SUMMARY OF THE INVENTION

The present invention suggests the architecture of a satellite communication system that combines the benefits of passive optical routing without requiring an excessive number of optical carriers. This is accomplished by noting that in large satellite communication systems such as LEO and MEO, only a small number of space vehicles are located above densely populated geographic areas, whereas the majority of satellites are flying over vast ocean bodies. This small subgroup of satellites is handling the majority of the data traffic, whereas the rest of the system transfers only a small fraction of inter-continental traffic.

Therefore, the present invention includes a communication system that utilizes passive optical routing only within the subset of active satellites. It is also observed that, due to their relative motion with respect to the Earth surfaces, every satellite in the systems becomes active or inactive at a given time. Therefore, the present invention allows re-configurability in order to accommodate the changes in the satellite's roles.

In the preferred embodiment, a group of seven satellites form an active cluster (which approximately corresponds to the number of vehicles above North America or Europe in a large LEO system, such as Teledesic). A minimal number of optical carriers may be allocated to achieve full non-blocking connectivity between all the satellites in the cluster.

In one aspect of the invention, a satellite constellation has a plurality of satellites. Each of said satellites has an RF ground link for communicating with a ground station and an optical link for communication with at least one of the plurality of satellites. Each of said satellites has a reconfigurable optical transmitter for sending and receiving data streams. Each reconfigurable optical transmitter has a first optical carrier associated therewith and a reconfigurable optical receiver. The plurality of satellites is arranged to have a first subset of satellites. The first subset of satellites is configured to communicate. The plurality of satellites is reconfigured to have a second subset of satellites having at least one different satellites than that of said first subset. The second subset supercedes the first subset. The second subset of satellites is configured to communicate. Various subset around the globe may form local area networks. The local area networks are preferably optically coupled to form a wide area network.

The advantage of the invention is in retaining the benefits of passive optical routing with a minimal number of required optical carriers. As a result of passive optical routing, the electronic switch on board a satellite is relieved of routing the relayed data traffic, thereby maximizing the overall data handling capacity. This may also conserve the overall system power consumption and weight. In addition, the network with passive optical routing is transparent to protocols in the sense that intermediate satellites do not have to understand the nature of the traffic (e.g., broadcast or digital internet) in order to relay it correctly to the recipient satellite. The proposed architecture is non-blocking, which results in maximum possible utilization of RF ground channels.

Another advantage of the invention is that the synchronization between satellites is not needed since a unique optical carrier is assigned for each intersatellite route.

Other advantages and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
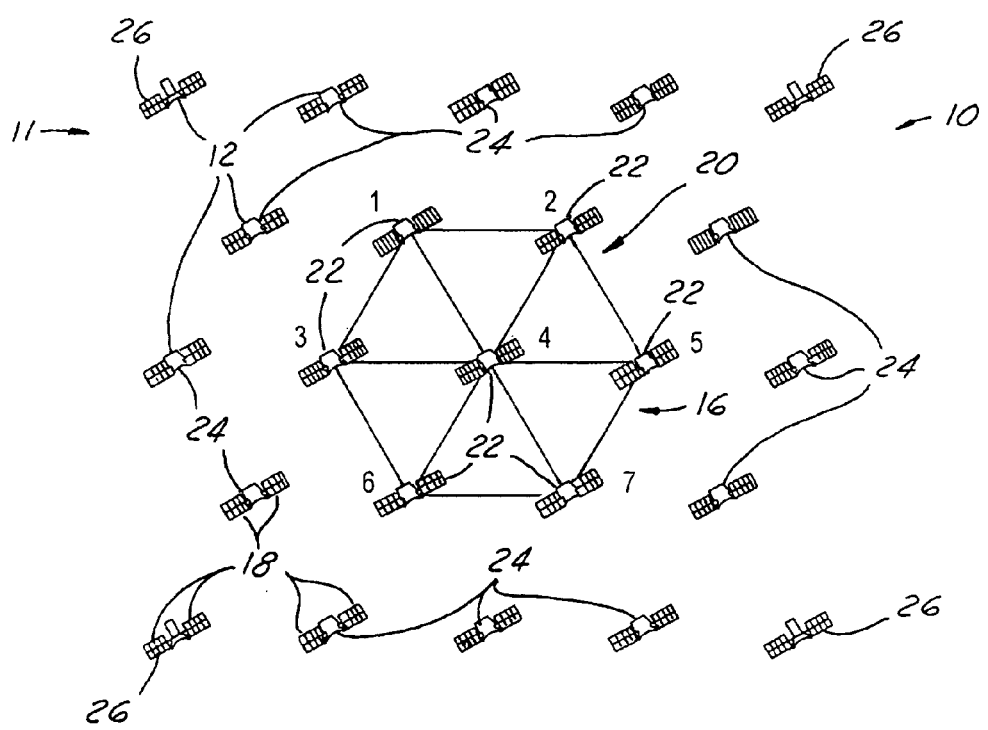
FIG. 1 is a view of a satellite constellation in the deployed configuration in which the present invention is applicable.

Referring now to FIG. 1, a communication system 10 includes satellite constellation 11 that has a plurality of satellites 12 orbiting the earth. Although not illustrated satellites 12 communicate with other satellites through an optical link and with ground stations (not shown) in a conventional manner. Although this invention may be used for other satellites in other types of orbits, this invention is particularly suitable for satellites in LEOs or MEOs. Due to the constant movement of the satellites, FIG. 1 is a snapshot of a portion of constellation 11.

Satellites 12 form a network 16. Network 16 is essentially a local area network (LAN) within satellite constellation 11. Each satellite 12 receives and transmits radio frequency (RF) communications to earth by way of antennas 18. As will be further described below, each satellite 12 may communicate with an adjacent satellite in network 16 using optical signals. Because satellites 12 are spaced apart with respect to the earth and, if satellites 12 are in LEO or MEO, the relative position of satellites 12 with respect to the earth is changing. At any particular time, one or more satellites 12 may be in view of the earth at a suitable elevation angle. The network 16 is comprised of satellites in view at a suitable elevation angle. As will be further described below, communications desired for a particular portion of the earth, such as a landmass, may be routed to one of the corresponding satellites 12 in view at that particular time from the landmass.

Figure 2:
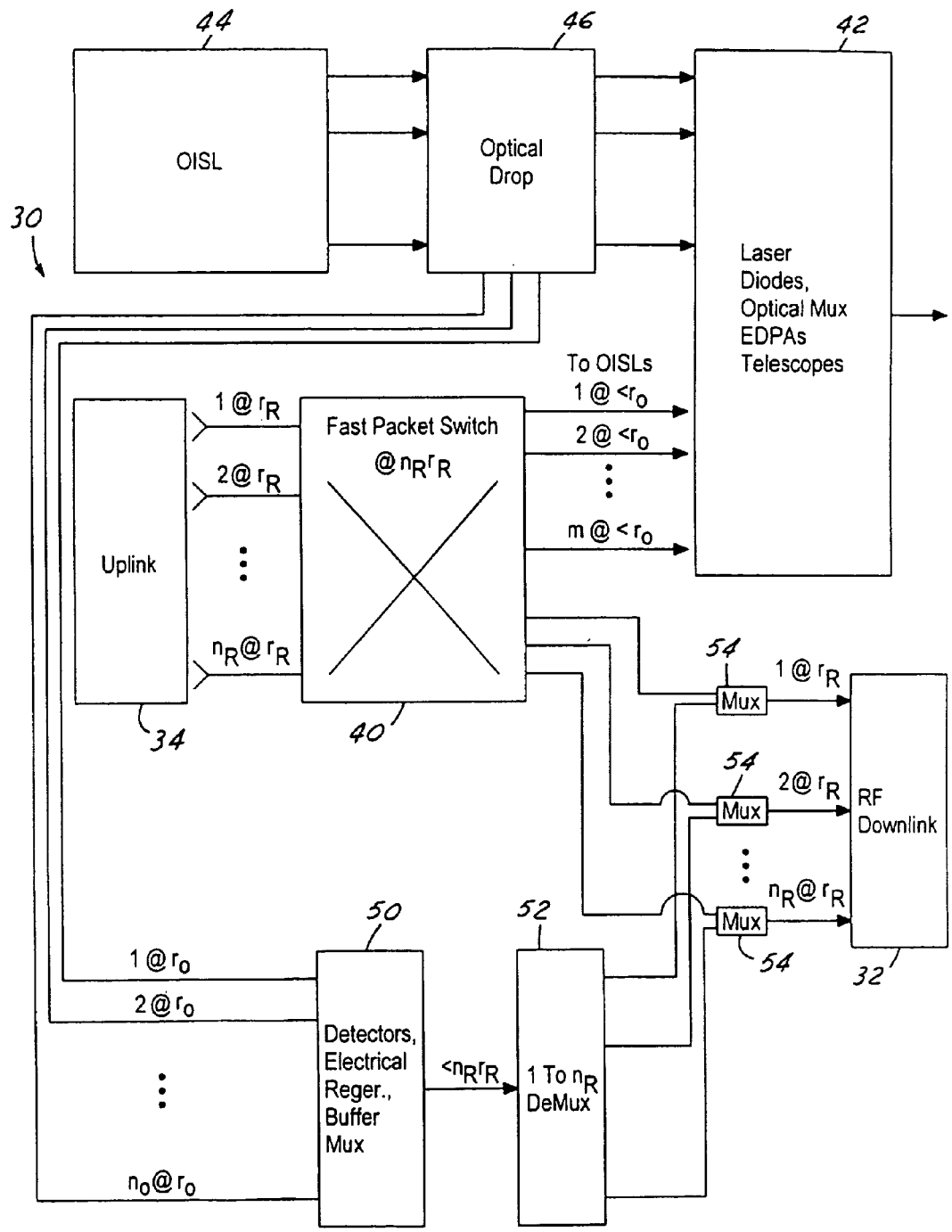
FIG. 2 is a schematic view of a node according to the present invention.

RF communications from the ground enter network 16 through a communications node 30 on each satellite 12 (FIG. 2). Preferably, all communications between satellites 12 occurs using optical links. By using the optical links, power consumption and weight of the payload are minimized.

Satellites 12 in constellation 11 may be grouped together in a subset 20 of active satellites 22. Active satellites 22 are shown in a hexagonal configuration with six outer satellites and one center satellite. However, a greater of fewer number of satellites may be included in the active configuration. The satellites have been labeled with an address number 1–7 to represent their relative positions.

A plurality of gateway satellites 24 may be deployed around active satellites 22. Gateway satellites 24 may not be actively communicating with ground terminals due to their unfavorable location above ground (e.g., they may be flying over ocean at a given time), but may be used by active satellites 22 to communicate with other active subsets, i.e., local area networks, over other landmasses.

Inactive satellites 26 are also illustrated. Inactive satellites 26 are not in use by constellation 11 at the moment of FIG. 1. However, due to the nature of the movement of MEOs and LEOs, satellites 12 may be reconfigured into a second subset that in appearance may be the same as FIG. 1 but with a different satellites. Network 16 may generally have the same relative position with respect to the landmass so that continuous coverage may be achieved. As satellites 12 move, their relative position will change with respect to the earth while maintaining network 16 in the same general location.

Referring now to FIG. 2, each satellite has a communications node 30. Communications node 30 has a downlink 32 and an uplink 34. In general, downlink 32 and uplink 34 are used to transmit radio frequencies (RF) to and receive RF signals from a ground station located on the earth.

For the following example, it is assumed that downlink 32 and uplink 34 have antennas and demodulators (not shown) that are commonly used in the satellite industry. Also, not shown for simplicity are error correctors, amplifiers and pointing and tracking components, which are common in the industry. For example, the downlink antennas and the uplink antennas may be phased-array antennas. Downlink 32 converts electrical communication signals into corresponding RF signals to be transmitted to a ground station. Uplink 34 converts the RF signals generated at a ground station into electrical signals for further processing. As shown, a single downlink 24 and a single uplink 26 are illustrated. However, those skilled in the art will recognize that various numbers of uplinks and downlinks may be used on satellites.

RF signals that are received through uplink 34 that are destined for other satellites are routed through fast electronic switch 40 where they are converted into optical signals and routed to another satellite through interface 42 as will be further described below. Fast packet switch 40 may, for example, be a an array of laser diodes. Fast packet switch 40 is preferably capable of transmitting all of the optical frequencies desired to be used for communication within the network.

The RF signals received through uplink 34 include data that is ultimately destined for retransmission to a ground terminal. To identify the destination of the data, a header or other identifying information may also be transmitted with the RF signal. The combination of data and routing information is known as an information packet and is used in an asynchronous transfer mode. Of course, other communications methods such as time-dependent multiple access (TDMA) or code dependent multiple access (CDMA) may also be used. The following description, however, will be limited to an ATM switch. Switch 40 routes signals to the ground through downlink 32.

Node 30 is coupled to other satellites by an optical intersatellite link (OISL) 44. OISL 44 includes a telescope and pointing and tracking apparatus. Interface 42 also uses a telescope and pointing and tracking devices. Those skilled in the art will understand that the same telescope may be used for transmitting and receiving optical signals simultaneously.

OISL 44 is coupled to an optical drop 46 which receives and removes and demultiplexes the optical signals of interest to node 30 from those received and allows signals not of interest to pass to interface 42.

As discussed above, both switch 40 and optical drop 46 are reconfigurable or realignable. That is, because each of the satellites in the active configuration is constantly changing, the various satellites must be constantly reassigned to communicate with other satellites in the constellation. Both the RF communications with the ground and the optical wavelength for communicating with other satellites may be reassigned or rearranged.

Optical drop 46 is coupled to an optical detector, electrical regenerator, buffer generally represented by having reference numeral 50.

In box 50, the optical signal is converted to an electrical signal. An electronic demultiplexer 52 and multiplexer 54 couple the electrical signals to RF downlink 32.

Figures 3, 4:
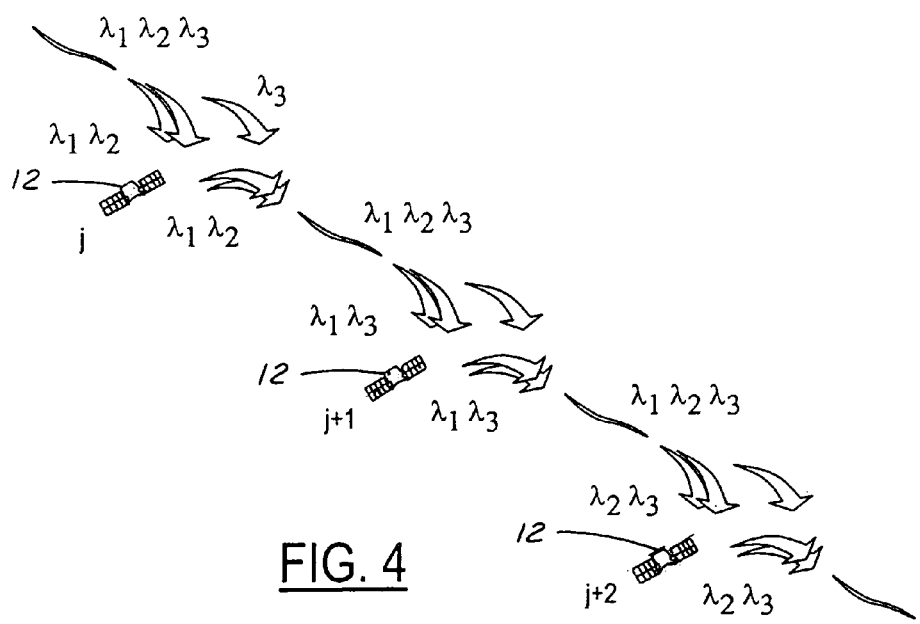
FIG. 3 is a connection table for the preferred connection between any two satellites in the network of FIG. 1.
FIG. 4 is an illustration of a connection and associated wavelengths according to the present invention.

Referring now to FIG. 3, a sample connection table 48 used by switch 40 for routing is illustrated. The upper row and leftmost column correspond to the satellite number of the satellite in network 16 illustrated in FIG. 1. Connection table 48 has a route for each connection. The data in the chart corresponds to the assigned route for transferring data between the numbered satellites. In practice, the table may include routing optical frequencies as well.

It is preferred that only a minimum amount of optical carriers be used in a network. This allows the reconfigurable transmitters and receivers of each satellite to have reduced complexity and thus less weight and cost. It should be noted that the reconfigurable receiver may be any one of a Fabry-Perot filter, a wavelength division multiplexer, and a fiber grating-based optical switch. If seven satellites are used, only three optical carriers for communications between the local area network satellites need to be used for communicating in one direction. This number should be doubled for a low-interference, full duplex traffic.

Connection table 48 has two types of cords or routes associated therewith; a diagonal cord and a peripheral cord. An example of diagonal cord is used in communications from satellite 5 to satellite 3 that are routed through satellite 4. An example of a peripheral cord is communications from satellite 2 to satellite 7 that are routed through satellite 5. In no case in the hexagonal configuration is more than three satellites required for full connectivity between each pair of satellites. At the worst case, only one intermediate satellite needs to be used.

Referring now to FIG. 4, three representative satellites from the system are illustrated; j, j+1 and j+2. FIG. 4 illustrates that only three separate optical carriers are required for a seven-satellite network. In order to reduce interference cross talk between transmitted and received signals, this number may be doubled in full duplex traffic. Wavelength assignment for one-way traffic in a peripheral cord is illustrated. The counterpropagting traffic is assumed to have three additional wavelengths $\lambda_4$–$\lambda_6$ (not shown). Traffic in a diagonal cord is similar, except that the left-most and right-most satellites (referred to as j and j+2, respectively) do not communicate with satellites located outside of the cord. In a peripheral cord, the satellite j receives an optical signal from satellite j–2 and j–1, which are not shown. The signal, from satellite j–2 contains a data stream designated for satellite j only, whereas the signal from the satellite j–1 may contain data streams for satellites j and j+1. In order to avoid interference and eliminate the need for synchronization, an individual optical carrier for each data stream is assigned, i.e. $\lambda_1$, $\lambda_2$ and $\lambda_3$ for the data streams between satellites j–2 and j, j–1 and j, and j–1 and j+1, respectively. The data streams designated for satellite j at wavelengths $\lambda_1$ and $\lambda_2$ are dropped from the optical system. Two new data streams designated for satellites j+1 and j+2 are added. Since optical carriers at $\lambda_1$ and $\lambda_2$ are free at this point, they are used for the data streams to satellites j+1 and j+2, respectively. Similar operations are performed on other satellites in the cord. The data traffic in the opposite direction can be uncoupled from that shown using commercially available circulators. Therefore, some optical carriers may be reused in the opposite directions. However, it might be advantageous to use separate wavelengths for the opposing traffic in order to further reduce the cross talk between transmitted and received data streams.

In operation, from the constellation of satellites, a specific network in view of a landmass is configured. This may be a local area network (LAN) for that landmass. Other landmasses may also have their own LANs. The LANs may be interconnected together to from a global coverage wide area network (WAN). Communication between LANs may be performed through one of the gateway satellites 24 or through one of the otherwise inactive satellites 26.

The network receives and transmits RF signals from a ground station. The RF signals are demodulated and modulated in a conventional manner into or from electrical signals. The node 30 either routes the electrical signals through the downlink in the same satellite if the signal is destined for transmission from the same satellite. If the received RF signal is destined for transmission by another satellite, the signal is routed to reconfigurable switch and wavelength selector 40 and optical telescope 42. Reconfigurable switch and wavelength selector 40 determines the proper route and wavelength using the information stored in connection table 48 and optical wavelength selector 40.

The information stored in optical wavelength selector 40 and connection table 48 may be updated by a ground station. The satellites are reconfigured as the satellites move with respect to the earth. The goal at any point in time is to maintain contact with a sufficient number of satellites so that the desired coverage level for the traffic from the satellite users on the landmass is maintained.

While particular embodiments of the invention have been shown and described, numerous variations and alternate embodiments will occur to those skilled in the art. Accordingly, it is intended that the invention be limited only in terms of the appended claims.

The invention claimed is:
1. A satellite constellation comprising:
a plurality of satellites, each of said satellites having an RF ground link for communicating with a ground station and an optical link for communication with at least one of the plurality of satellites;

each of said satellites having a reconfigurable optical transmitter and a reconfigurable optical receiver for sending and receiving data streams, each reconfigurable optical transmitter having an optical carrier associated therewith;

said plurality of satellites arranged to have a first subset of satellites, said first subset of satellites are configured to communicate therebetween as a first local area network over a landmass;

said plurality of satellites arranged to have a second subset of satellites having at least one satellite different than that of said first subset and at least one second satellite the same as the first subset, said second subset of satellites are configured to communicate therebetween as a second local area network over the landmass.

2. A satellite constellation as recited in claim 1 wherein each of said plurality of satellites comprises a communications table.

3. A satellite constellation as recited in claim 2 wherein said communications table has a plurality of routes for communicating between satellites in said first subset.

4. A satellite constellation as recited in claim 1 wherein said reconfigurable optical transmitter comprises an array of laser diodes.

5. A satellite constellation as recited in claim 1 wherein said optical transmitter is tunable to generate a plurality of wavelengths.

6. A satellite constellation as recited in claim 1 wherein said reconfigurable optical receiver is one from a group consisting of a Fabry-Perot filter, a wavelength division multiplexer, and a fiber grating-based optical switch.

7. A satellite constellation as recited in claim 1 wherein said satellites are in low earth orbit.

8. A satellite constellation as recited in claim 1 wherein said satellites are in medium earth orbit.

9. A satellite constellation as recited in claim 1 wherein said first and second subsets are aligned with a landmass.

10. A satellite constellation as recited in claim 1 wherein said subset comprises seven satellites using three optical carriers.

11. A global communications system comprising:
a plurality of satellites spaced about the earth;
a first subset of said plurality of satellites forming a local area network over a landmass, said first subset having a first plurality of optical carriers assigned thereto for intercommunication;
said first subset having a second plurality of optical carriers assigned thereto for communicating with other satellites outside of said first subset.

12. A global communications system as recited in claim 11 wherein each of said plurality of satellites comprises a communications table.

13. A global communications system as recited in claim 12 wherein said communications table has a plurality of paths for communication between said satellites of said first subset.

14. A global communications system as recited in claim 11 wherein each of said satellites comprises a reconfigurable optical transmitter and a reconfigurable optical receiver.

15. A global communications system as recited in claim 14 wherein said reconfigurable optical transmitter comprises an array of laser diodes.

16. A global communications system as recited in claim 14 wherein said reconfigurable optical transmitter is tunable to generate a plurality of wavelengths.

17. A method of communicating within a satellite communications system comprising the steps of:
deploying a plurality of satellites;
grouping a first subset of the plurality of satellites into a first local area network over a first landmass, said first subset having fewer than the plurality of satellites;
forming a plurality of routes between the satellites in the first local area network; and
assigning an optical carrier for each route.

18. A method as recited in claim 17 further comprising the steps of forming a second local area network over a second landmass by grouping a second subset of the plurality of satellites and interconnecting the first local area network and the second local area network to form a wide area network.

19. A method as recited in claim 18 wherein the first landmass and second landmass are coincident.

20. A method as recited in claim 17 wherein the step of assigning an optical carrier comprises the step of obtaining the optical carrier and route from a respective optical wavelength selector and connection table.

21. A method as recited in claim 17 wherein the step of assigning comprises the step of reusing the optical carriers.

22. A method as recited in claim 17 wherein assigning an optical carrier for each route comprises assigning a first set of optical carriers for communication within the first local area network and a second set of optical carriers for communication with other satellites outside of said first local area network.

23. A satellite constellation comprising:
a plurality of satellites, each of said satellites having an RF ground link for communicating with a ground station and an optical link for communication with at least one of the plurality of satellites;
each of said satellites having a reconfigurable optical transmitter and a reconfigurable optical receiver for sending and receiving data streams, each reconfigurable optical transmitter having an optical carrier associated therewith;
said plurality of satellites arranged to have a first subset of satellites over a landmass, said first subset of satellites are configured to communicate therebetween;
said plurality of satellites arranged to have a second subset of satellites over the landmass that supercede the first set of satellites, said second subset of satellites having at least one satellite different than that of said first subset, said second subset of satellites are configured to communicate therebetween.

24. A satellite constellation as recited in claim 23 wherein each of said plurality of satellites comprises a communications table.

25. A satellite constellation as recited in claim 24 wherein said communications table has a plurality of routes for communicating between satellites in said first subset.

26. A satellite constellation as recited in claim 23 wherein said reconfigurable optical transmitter comprises an array of laser diodes.

27. A satellite constellation as recited in claim 23 wherein said optical transmitter is tunable to generate a plurality of wavelengths.

28. A satellite constellation as recited in claim 23 wherein said reconfigurable optical receiver is one from a group consisting of a Fabry-Perot filter, a wavelength division multiplexer, and a fiber grating-based optical switch.

29. A global communications system comprising:
a plurality of satellites spaced about the earth;
a first subset of said plurality of satellites forming a first local area network over a landmass, said first subset having a first plurality of optical carriers assigned thereto for intercommunication;

a second subset of said plurality of satellites forming a second local area network over the landmass, said second subset having a second plurality of optical carriers assigned thereto for intercommunication;

said first subset having a third plurality of optical carriers assigned thereto for communicating with said second subset.

30. A global communications system as recited in claim 29 wherein said second subset has a fourth plurality of optical carriers assigned thereto for communicating with said first subset.

31. A method of communicating within a satellite communications system comprising the steps of:

deploying a plurality of satellites;

grouping a first subset of the plurality of satellites into a first local area network;

superceding said first subset by grouping a second subset of the plurality of satellites into a second local area network so that at least one satellite of said second subset of the plurality of satellites is different than that of said first subset of the plurality of satellites wherein superceding said first subset comprises reconfiguring a reconfigurable optical transmitter for each of the satellites in the second subset.

32. A method as recited in claim 30 wherein reconfiguring a reconfigurable optical transmitter comprises changing a plurality of routes between the satellites in the second local area network relative to the first local area network.

* * * * *